Sept. 14, 1965 M. NADLER 3,206,592

PHOTOGRAPHIC STORAGE SYSTEM

Filed Oct. 30, 1962 4 Sheets-Sheet 1

Sept. 14, 1965 M. NADLER 3,206,592

PHOTOGRAPHIC STORAGE SYSTEM

Filed Oct. 30, 1962 4 Sheets-Sheet 2

United States Patent Office
3,206,592
Patented Sept. 14, 1965

3,206,592
PHOTOGRAPHIC STORAGE SYSTEM
Morton Nadler, Fresnes, France
(94 Avenue Gambetta, Paris 20, France)
Filed Oct. 30, 1962, Ser. No. 234,170
Claims priority, application France, Nov. 2, 1961, 877,723
6 Claims. (Cl. 235—61.12)

Figure 1:
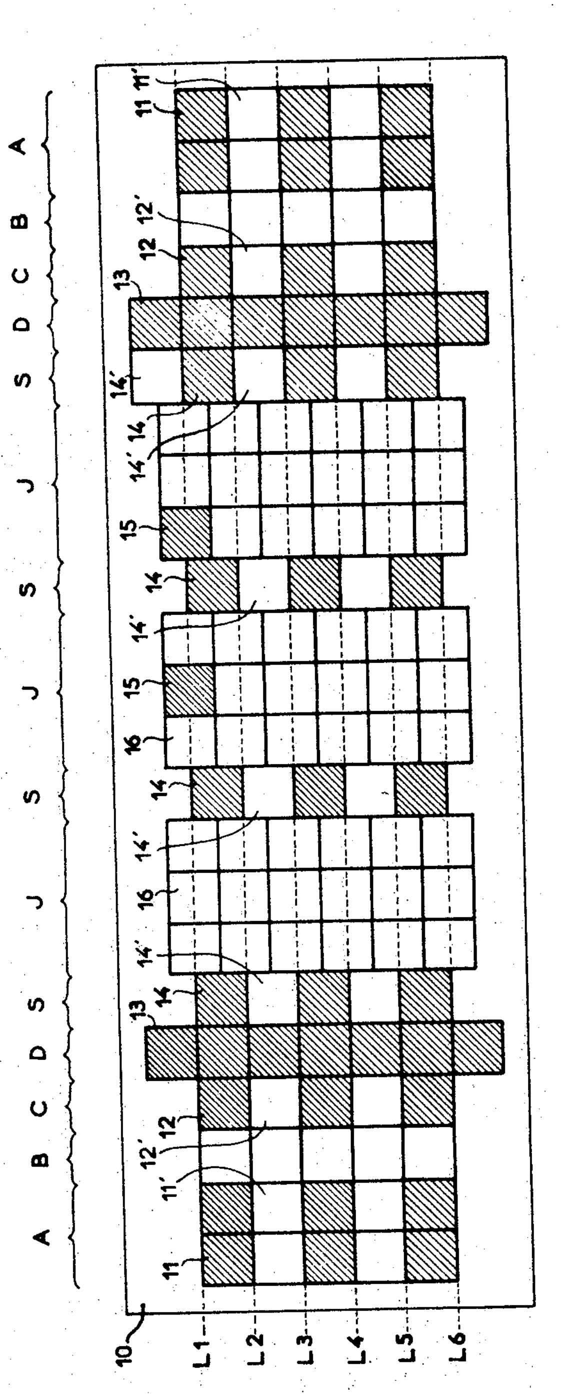

This invention relates to photographic storage systems comprising an information storage member having a photographic support to which are applied marks serving to define information in accordance with a code and to control the operation of the reading device of the system.

The invention relates more especially to photographic storage systems comprising a storage member on which marks serving to define elements of information (information marks) are disposed in a number of rows (information rows). Locating columns formed of particular marks called locating marks are intercalated at regular intervals among the information marks. They determine in the reading device, in the course of the scanning of each line, the production of particular signals which are used to control the operation of the reading device at regular intervals in the course of the said scanning.

Storage systems of the type under consideration generally comprise a moving-spot reading device arranged to read row-by-row information carried by the storage member, and to control with precision the position of the moving spot in the course of the scanning of each row.

In a known system, the locating marks of each information row are in the form of a triangle, of which one apex and the opposite side are situated on either side of the row under consideration. The interval of time during which the moving spot scans a locating mark then depends, in the event of deflection of the spot, upon the distance between the latter and the axis of the information row undergoing scanning and the measure of this interval of time makes it possible to generate an adjusting quantity which is utilised in a correcting direction to bring the spot on to the axis of this line.

Locating marks of this type cannot supply a perfectly defined adjusting quantity which can be used when the information rows are very close together and when the dimensions of the locating marks must not exceed those of the information marks.

The invention concerns a photographic storage system comprising an information storage member having a photographic support to which have been applied locating marks whose dimensions do not exceed those of the information marks and which are capable of controlling with greater precision than has hitherto been possible the operation of the reading device of the storage system under consideration.

The invention also relates to a storage system utilising such a storage member and provided with means for controlling with precision the position of the moving spot starting with the adjusting quantity obtained at the instant when the spot scans a locating mark.

By increasing the operation accuracy of the reading device of a system of the type under consideration, the invention makes it possible to increase the information density on the storage member employed in this system.

A storage system according to the invention comprises an information storage member consisting of a photographic support to which there have been applied in rows and in contiguous columns information marks of like form and like dimensions, each of which has a common axis of symmetry with those of the same row, and of which the particular optical characteristics (for example transmission factor and reflection factor) make it possible to defined information elements in accordance with a code, the storage member being characterised by the fact that the said rows are interrupted at regular intervals by locating columns each formed of contiguous locating marks which have the same form and the same dimension as the information marks but are offset by a half-row spacing in relation to the latter, so that the line separating two adjacent locating marks of a locating column is coincident with the common axis of symmetry of the information marks of one row any two adjacent locating marks of a locating column having different optical characteristics.

In order to simplify the description, it will first be assumed that each information mark, and likewise each locating mark, consists in accordance with its particular function of an opaque area or of a transparent area of the photographic support.

During the regular scanning of a row of information, the spot is constantly centred on the axis of the said row and, at the instant of the scanning of a locating column, it covers equal portions of the two respectively opaque and transparent locating marks situated on either side of the axis of the said row. The reading device then supplies a scanning signal whose amplitude is the arithmetical mean between the amplitudes of the scanning signals supplied by the device at the instant of the scanning of an opaque area and at the instant of the scanning of a transparent area, respectively, of the photographic support, under otherwise equal conditions.

If, in the course of the scanning of a row of information, the spot is not centered on the axis of this row at the instant of the scanning of a locating column, it covers a greater portion of one of the two locating marks situated on either side of the axis of the row undergoing scanning in proportion as it is further from this axis, and in accordance with the direction of its deflection, it covers a larger portion of one or other of these two marks. The amplitude of the scanning signal, at the instant of the scanning of a locating mark, therefore depends both upon the extent of the deflection of the moving spot and upon the direction of this deflection, and it may consequently be used to generate an adjusting signal which, when appropriately applied to the deflecting circuits of the reading device, makes it possible to cancel out the deflection of the moving spot.

The storage member according to the invention may in addition be characterised by end-of-row identification marks capable of controlling the storage system at the end of the scanning of each row of information so as to prepare for the scanning of an adjacent row.

The means by which the position of the moving spot in a storage system according to the invention may be controlled comprise a circuit for generating signals representing the error in the position of the spot in the direction perpendicular to the rows of information (vertical position errors) and a circuit generating signals representing errors in the position of the spot in the direction parallel to the rows of information (horizontal position errors). Each of these circuits utilises locating signals which are signals of appropriate amplitude coincident with the scanning signals supplied by the reading device during the passages of the spot on the scanning of the locating columns.

The vertical position error signal generating circuit comprises a circuit controlled both by the locating signals and by the scanning signals and capable of generating a reference signal (grey reference signal) identical to the scanning signal which would be supplied by the reading device if the spot were perfectly centred on the axis of the scanned row at the instant of its passage over a locating column. The vertical position error signal generating circuit comprises in addition a circuit controlled both by the locating signals and by the scanning signals and capable of extracting the scanning signals (grey scanning signals) effectively supplied by the reading device at the instant of the passage of the spot over a locating column. The vertical position error signal generating circuit finally comprises a circuit capable of comparing the grey scanning signals with the grey reference signal to form vertical position error signals.

The horizontal position error signal generating circuit is capable of comparing the position in time of clock signals with the locating signals to form horizontal position error signals.

Figure 2:
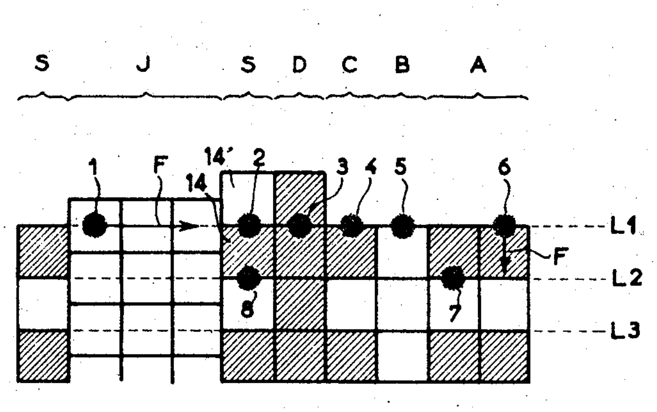
Figure 2A:
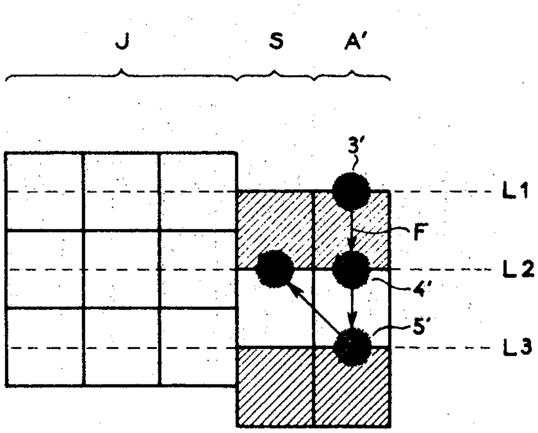
Figure 3:
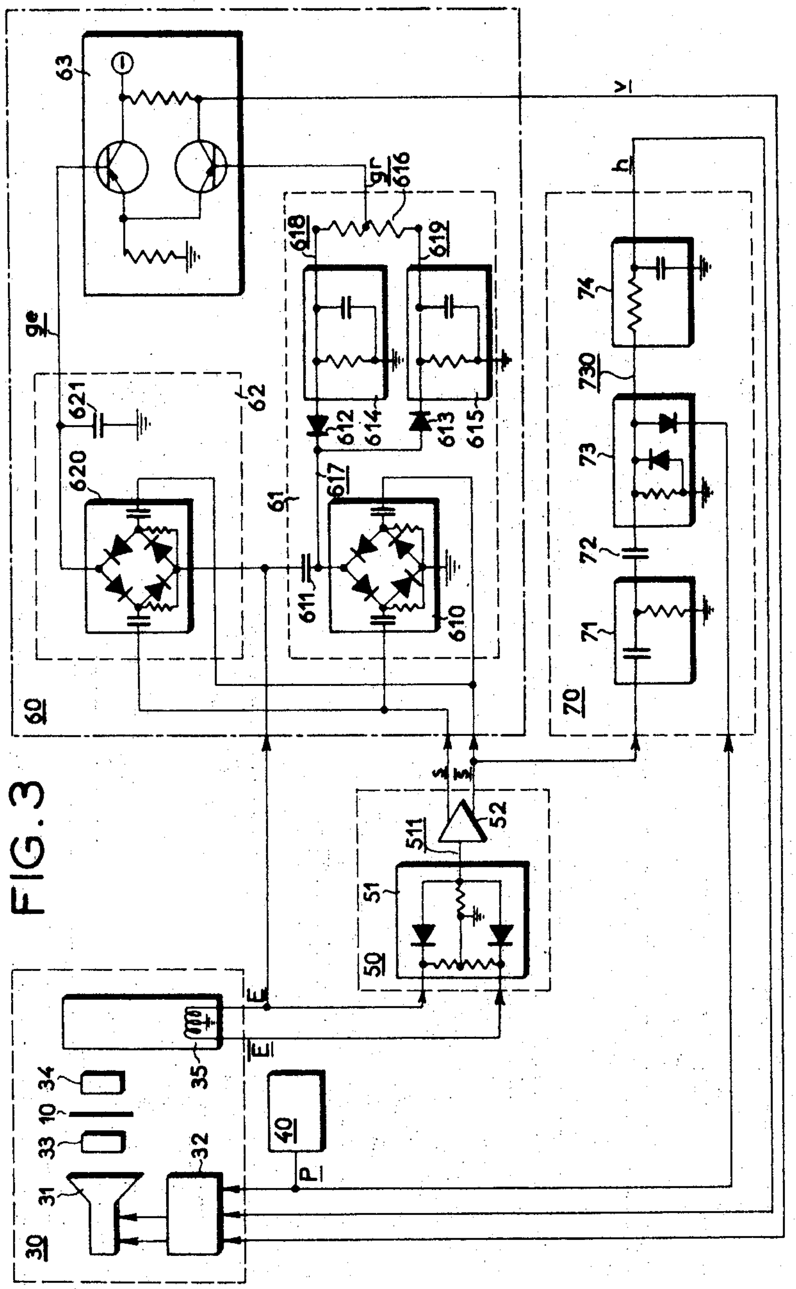
Figure 4:
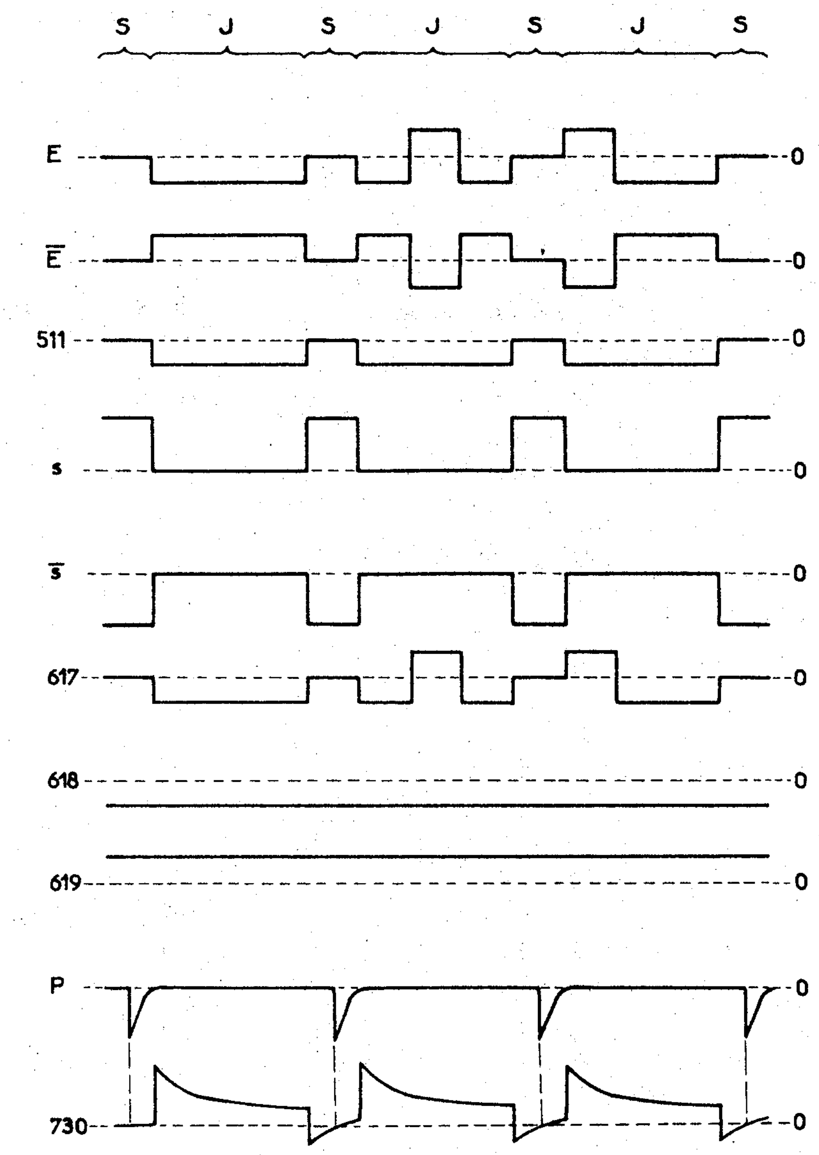

For a better understanding of the invention and to show how it may be carried into effect, the same will now be described, by way of example, with reference to the accompanying drawings, in which:

FIGURE 1 illustrates one constructional form of an information storage member according to the invention, FIGURE 2 illustrates a part of an information storage member such as that of FIGURE 1, FIGURE 2*a* illustrates a part of an information storage member such as that of FIGURE 1, in accordance with a modified embodiment of the invention, FIGURE 3 is a diagram of circuits for controlling the position of the moving spot in a storage system according to the invention, and FIGURE 4 illustrates the form of the signals set up at certain points of the circuits illustrated in FIGURE 3.

FIGURE 1 illustrates an information storage member 10 according to the invention. This information storage member is a transparent photographic plate having opaque areas such as 11, 12, 13, 14 and 15. Those parts of the plate which do not form opaque areas form transparent areas, and in order to simplify the terminology the terms "black" and "white" will be used in referring to the opaque and transparent areas respectively. There will be seen on the said storage member a number of vertical zones A, B, C, D, S and J, which will be referred to as the row change zone, the reference zone of the white signals, the end-of-row indication zone, the reference zone of the black signals, the locating zone and the information zone. The unbroken lines bounding the square elemental locations in the zones A, B, C, D, S and J, the chain lines L1, L2, . . . L6, which represent the axes of symmetry of the elemental locations of the zones J, serve to locate the position of the opaque and transparent areas in the various zones of the storage member. In practice, they do not appear on the latter.

The operation of the storage system and of its reading members depends upon the particular arrangement of the opaque areas and of the transparent areas on the information storage member.

It will be seen from FIGURE 1 that the various elemental locations of the zones J lie in rows and in adjacent columns, the elemental locations of the various rows (information rows) being centered on the axes L1, L2, . . . L6, respectively. In the zones J, the relative positioning of the locations forming an opaque area 15 and of the locations forming a transparent area 16 is representative of information in accordance with a code.

In each of the zones A, C and S, the region situated between the axes L1 and L2 is an opaque area, i.e., 11, 12 and 14 respectively. The same is the case with the regions situated in these same zones between L3 and L4 and between L5 and L6. On the other hand, the regions 11', 12' and 14' situated between L2 and L3 and between L4 and L5, as also the regions situated above L1 and below L6 are transparent areas. In each of these zones A, C and S, each of the axes L1 to L6 thus constitutes the separating line between an opaque area and a transparent area.

A portion of FIGURE 1 is shown in FIGURE 2. The black circles 1, 2, 3, . . . 8 indicate the successive positions of a luminous spot produced on the information storage member by a scanning light beam in the course of a reading operation of the information storage member. The arrows F indicate the direction of movement of the spot during this operation.

In position 1 (FIGURE 2), the spot is situated in an information zone J at the center of an elemental location. In position 2, the spot is situated in a locating zone S on the axis L1, which constitutes the separating line between an opaque area 14 and a transparent area 14' of this zone. That portion of the spot which is situated above the axis L1 lies on the transparent area, while that portion of the said spot which is situated below the axis L1 lies on the opaque area. In position 8, the spot is also situated in a locating zone S, but this time on the axis L2 and the upper and lower portions of this spot are then situated on an opaque area and on a transparent area of this zone, respectively.

An information storage member of the type described above may be used in a storage system of the type diagrammatically illustrated in FIGURE 3. Such a storage system comprises a moving-spot reading device 30, a clock pulse generating device 40, a locating signal extraction circuit 50, a vertical position error signal generating circuit 60 and a horizontal position error signal generating circuit 70.

FIGURE 4 illustrates the form of the signals set up at certain points of the electric circuit of this storage system during the scanning of the zones S and J of the first row of the information storage member illustrated in FIGURE 1. The signals set up at a common instant are shown in this figure in a common column and the zone indications S and J at the top of FIGURE 4 correspond to the zone indication S and J at the top of FIGURE 1.

The reading device 30 supplies direct and complementary scanning signals E and $\overline{E}$. The device 40 emits clock pulses P. The circuit 50 receives the signals E and $\overline{E}$ and supplies direct and complementary locating signals *s* and $\overline{s}$. The circuit 60 receives the signals E, *s* and $\overline{s}$ and supplies vertical position error signals *v*. The circuit 70 receives the locating signals $\overline{s}$ and the clock pulses P and supplies horizontal position error signals *h*. The clock pulses P, as also the signals *v* and *h*, are applied to the reading device 30.

The reading device 30 comprises a cathode-ray tube 31, deflection circuits 32, optical systems 33 and 34 and a photoelectric device 35. The information storage member 10 which is to be subjected to the reading is disposed between the optical systems 33 and 34. Such a reading device is well known and a detailed description thereof is unnecessary. The deflection circuits 32 control the cathode-ray tube 31 in such manner that in the course of a reading operation of the information storage member a spot is formed on this storage member and explores it row-by-row the direction of movement of the spot being reversed at each row during such a reading operation.

The photoelectric device 35 supplies the direct and complementary scanning signal E and $\overline{E}$, which are a function, at each instant, of the luminous flux passing through the information storage member thus scanned.

In FIGURE 4, negative and positive excursions of the signal E correspond respectively to the scanning of the transparent areas and of the opaque areas centered on the line L1 of the information storage member and will be called white signals and black signals respectively.

The zero-level portions of the signal E correspond to the scanning of the zones S when the scanning spot is centred on the line L1 as shown in FIGURE 2 in position 2. These portions of the signal E will be called grey scanning signals.

The locating signal extraction circuit 50 comprises an extraction circuit proper 51 consisting of resistances and diodes, as shown in FIGURE 3, and an amplifier 52. When the signals E and $\overline{E}$ (FIGURE 4) are applied to the input of the circuit 51, the latter supplies the signal 511 (FIGURE 4), which comprises zero level excursions only during the scanning of the locating zones S. The signal 511 is applied to the input of the amplifier 52 and this amplifier supplies direct and complementary locating signals $s$ and $\bar{s}$ (FIGURE 4).

The vertical position error signal generator 60 comprises a circuit 61 generating grey reference signals, a circuit 62 generating grey scanning signals and a comparator circuit 63.

This circuit 61 comprises the voltage clamping circuit 610, the diodes 612 and 613, the resistance-capacitance filters 614 and 615 and the voltage divider 616. The signals E, $s$ and $\bar{s}$ are applied to the device 610 (the signal E being applied through the condenser 611). The signal 617 (FIGURE 4) transmitted by the circuit 610 to the diodes 612 and 613 is the scanning signal E brought to the level O (which is that of earth) by the pulses $s$ and $\bar{s}$ at each scanning of a zone S.

The negative and positive excursions of the signal 617 correspond, respectively, to the scanning of the transparent areas and of the opaque areas of the information storage member. The filters 614 and 615 then supply at each instant, respectively, the voltages 618 and 619 which represent the maximum values of these negative and positive excursions in the course of a predetermined interval of time preceding this instant. The length of this interval of time is determined by the time constant of the filters 614 and 615. The time constants of the filters may be so chosen that during the scanning of a whole row the voltages 618 and 619 retain the maximum values taken from the beginning of the scanning of the row under consideration. Normally, these maximum values are reached at the instant of the scanning of the zones B and D. The voltage divider 616 then supplies the voltage $gr$ which constitutes the grey reference signal, at the instant under consideration, taking into account the state of the information storage member along the region scanned during the said predetermined interval of time which preceeds this instant, and also taking into account the operating characteristics of the reading device during this interval of time.

The circuit 62 comprises a voltage-phasing circuit 620 and a condenser 621. The signals E, $s$ and $\bar{s}$ are applied to the circuit 620 in the manner indicated in FIGURE 3. Under these conditions, the value of the voltage $ge$ set up across the terminals of the condenser 621 at the instant of the scanning of each zone S is that of the grey scanning signal at this instant and remains unchanged throughout the scanning of the consecutive zone J.

The signals $gr$ and $ge$ are applied to the comparators 63, which supply a voltage $v$ proportional to their difference. This voltage $v$ constitutes the vertical position error signal and is applied in a correcting sense to the deflection circuit 32 of the reading device 30 so as to adjust the vertical position of the scanning spot.

The circuit 70 comprises: the differentiating circuit 71, the condenser 72, the voltage phasing circuits 73 and the integrating circuit 74. The circuit 73 supplies a signal 730 (FIGURE 4) which is the differential signal $\bar{s}$ returned to the zero level at each negative pulse P. The voltage $h'$ set up at the output of the circuit 74 is the mean value of the signal 730 and constitutes the horizontal position error signal. This signal is applied in a correcting sense to the deflection circuit 32 of the reading device so as to adjust the scanning speed and to maintain centred on the clock pulses P the scanning pulses of the zones S. In order further to improve the phase synchronisation conditions of the system, it is possible to use the rear flank of the pulses $s$ to control the operating frequency of the clock at the beginning of the scanning of each zone J.

The foregoing description shows how the locating zones S may be used to adjust the position of the scanning spot during the scanning of a line L1 of the information storage member illustrated in FIGURE 1.

The opaque areas and the transparent areas of which the locating zones S are formed and which constitute the marks for the location of the position of the spot are so situated that during the scanning of a zone S at the level of the axis L1 of a row of information that portion of the spot which is situated above L1 lies on a transparent area and that portion of the said spot which is situated below L1 lies on an opaque area, while the inverse conditions exist during the scanning of a zone S at the level of the axis L2 of the succeeding row.

The direction of application of the vertical position error signal must therefore be reversed at each row change.

The zones A, B, C, D (FIGURES 1 and 2) situated at the end of the information rows serve to supply to the system items of information by means of which the spot can be guided during the scanning row change. As may be seen from FIGURE 2, immediately after the scanning of the last zone S of a row of axis L1 (position 2), the spot scans the zone D (position 3). The zone D forms an opaque column. At the instant when it reaches the axis of the zone D, the spot, regardless of its vertical position, cannot intercept transparent areas since the whole column is opaque. The scanning signal supplied at this instant by the reading device consequently has a positive maximum value, under otherwise equal conditions, and constitutes a black reference signal.

The maximum positive excursion of the scanning signal thus obtained is recorded by means of the filter 615, as has previously been seen.

The spot thereafter scans a zone C (position 4). The zone C is identical to a zone S. A grey scanning signal is then supplied by the reading device. The recognition of a grey signal outside its normal time of appearance has the effect of enabling the storage system to scan the succeeding row.

The spot thereafter scans a zone B (position 5). The zone B forms a completely transparent column, so that the reading device supplies a negative scanning signal of maximum amplitude. This signal constitutes a white reference signal. The negative excursion of the scanning signal thus obtained is recorded by means of the filter 614.

The spot finally scans a zone A (position 6). The zone A is identical to two juxtaposed zones S. The row-changing operation has the effect of bringing the spot on to the succeeding row in the same zone A (position 7). It also has the effect of reversing the direction of scanning and the direction of application of the vertical position error signal.

It will be understood that the information storage member described in the foregoing by way of example constitutes only one embodiment of the invention, which covers all variants thereof.

Thus, the zones which are situated at the ends of the information rows and which serve to control the operations of changing the scanning row, may be reduced to an end-of-row indication zone A′ formed and positioned as illustrated in FIGURE 2*a*. The successive positions of the spot during a row-changing operation may then be those indicated by the black circles 3′, 4′, 5′.

By application of the techniques at present known, it has been possible to produce and to use, by applying the principles of the invention, a photographic storage element capable of storing $5 \times 10^5$ elements of information per cm.$^2$.

In addition, if a colour film is employed and three different colours X, Y and Z may be obtained on the film, it will be possible to form the areas 14 of the zones S by simultaneously producing thereon the three colours X, Y and Z, while the items of information may be recorded in the zones J by forming a coloured area in each location 16 of these zones. If one or two of the three colours X, Y and Z are caused to appear in each location of these zones, by utilising the code indicated in the following table, the number of binary digits which it is possible to record in the zones J is equal to twice the number of locations 16 of these zones, since the difference of the optical characteristics of two successively scanned locations makes it possible to define two binary digits, as is shown by the following table. In addition, if items of information are recorded in the manner just described, two adjacent locations of a zone J always differ by the existence of a colour in one of these locations and the absence of this colour in the other. Consequently, it is possible to obtain during the scanning of each location a signal by means of which the synchronisation of the scanning may be controlled. The zones S then only have to perform the function of adjusting the vertical position of the spot.

In the following table, the bracketed expressions mean:

$$\left\{\begin{matrix}\text{optical characteristics} \\ \text{of one location}\end{matrix} \rightarrow \begin{matrix}\text{optical characteristics of} \\ \text{the succeeding location}\end{matrix}\right\}$$

The binary digits placed after the sign = at the end of each row constitute the items of information defined by the differences of the optical characteristics indicated in brackets.

$$(X\rightarrow ZX)=(Y\rightarrow X)=(XY\rightarrow Y)=(Z\rightarrow XY)=(ZX\rightarrow Z)=00$$

$$(X\rightarrow Y)=(Y\rightarrow XY)=(XY\rightarrow Z)=(Z\rightarrow ZX)=(ZX\rightarrow X)=01$$

$$(X\rightarrow XY)=(Y\rightarrow Z)=(XY\rightarrow ZX)=(Z\rightarrow X)=(ZX\rightarrow Y)=10$$

$$(X\rightarrow Z)=(Y\rightarrow ZX)=(XY\rightarrow X)=(Z\rightarrow Y)=(ZX\rightarrow XY)=11$$

What is claimed is:

1. An information storage member consisting of a slide which carries a set of information areas in the form of squares of the same dimension arranged in rows and columns, the information areas pertaining to the same row having a common axis of symmetry, each of said information areas exhibiting at least one out of at least two optical properties so as to represent information according to a code, said slide further carrying guide areas of the same form and dimension as the information areas arranged in guide columns which divide the set of information areas in groups of columns of information areas, two adjacent guide areas of a guide column exhibiting different optical properties and adjoining each other along their side which is aligned with the common axis of symmetry of the information areas of a row.

2. An information storage member consisting of a slide carrying a set of information areas each exhibiting at least one out of at least two optical properties so as to represent information according to a code, said information areas having the form of squares of the same dimension and being arranged in rows and columns, the information areas pertaining to the same row having a common axis of symmetry, said set of information areas being divided in groups of columns of information areas by equally spaced guide columns formed of guide areas which have the same form and dimension as the information areas and of which any two adjacent ones exhibit different optical properties and are contiguous to each other along their side which is aligned with the common axis of symmetry of the information areas of a row.

3. A record member carrying columns and rows of information marks having the form of squares of the same dimension, the information marks pertaining to the same row having a common axis of symmetry, said record member further carrying columns of guide marks located between groups of columns of information marks, said guide marks having the same form and dimension as the information areas, two adjacent guide marks of a column exhibiting different physical properties and being contiguous to each other along their side which is aligned with the common axis of symmetry of the information marks of a row.

4. A record member according to claim 3, carrying at least one column of guide marks on one side of the set of information marks.

5. A record member according to claim 3, wherein an information element is represented according to a code by differences between physical properties of two adjacent information marks of a row.

6. A record member according to claim 3, wherein each information mark is coloured so as to represent information according to a code.

References Cited by the Examiner

UNITED STATES PATENTS 2,791,695 5/57 Bareford et al. ------ 328—121 X

FOREIGN PATENTS 1,192,975 4/59 France.
828,862 2/60 Great Britain.

DAVID J. GALVIN, *Primary Examiner.*

ARTHUR GAUSS, JOHN W. HUCKERT, *Examiners.*